United States Patent
Ku

(10) Patent No.: US 8,913,733 B2
(45) Date of Patent: *Dec. 16, 2014

(54) PROACTIVE TELEPHONE NUMBER MAPPING CONFIGURATION MANAGEMENT

(71) Applicant: AT&T Intellectual Property I, L.P., Atlanta, GA (US)

(72) Inventor: Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,691

(22) Filed: Jun. 3, 2013

(65) Prior Publication Data

US 2013/0266132 A1 Oct. 10, 2013

Related U.S. Application Data

(63) Continuation of application No. 13/681,059, filed on Nov. 19, 2012, now Pat. No. 8,477,927, which is a continuation of application No. 12/467,573, filed on May 18, 2009, now Pat. No. 8,363,815.

(60) Provisional application No. 61/159,746, filed on Mar. 12, 2009.

(51) Int. Cl.
*H04M 3/42* (2006.01)
*H04M 7/12* (2006.01)
*H04W 40/00* (2009.01)

(52) U.S. Cl.
CPC .............. *H04W 40/00* (2013.01); *H04M 7/123* (2013.01); *H04M 7/128* (2013.01)

USPC ............ 379/221.01; 379/221.02; 379/221.13; 379/220.01

(58) Field of Classification Search
USPC .............. 379/221.01, 221.02, 221.13, 220.01
See application file for complete search history.

(56) References Cited

U.S. PATENT DOCUMENTS

| | | |
|---|---|---|
| 2005/0286531 A1 | 12/2005 | Tuohino et al. |
| 2006/0029043 A1 | 2/2006 | Nishida et al. |
| 2006/0083222 A1 | 4/2006 | Miyajima et al. |
| 2006/0262917 A1 | 11/2006 | Marsico |
| 2008/0101582 A1 | 5/2008 | Hua et al. |
| 2009/0161854 A1 | 6/2009 | Ku et al. |
| 2010/0149995 A1 | 6/2010 | Khan et al. |
| 2010/0150143 A1 | 6/2010 | Ku |
| 2010/0205268 A1 | 8/2010 | Zhu et al. |
| 2011/0149956 A1 | 6/2011 | Alt et al. |
| 2012/0076292 A1 | 3/2012 | Schultz et al. |

OTHER PUBLICATIONS

3GPP TS 23.228, V8.7.0 3rd Generation Partnership Project; Technical Specification Group Services and System Aspects; IP Multimedia Subsystem (IMS); Stage 2 (Release 7) 180 pages, Jun. 3, 2013.

(Continued)

*Primary Examiner* — Quynh Nguyen
(74) *Attorney, Agent, or Firm* — Amin, Turocy & Watson, LLP

(57) ABSTRACT

Efficient telephone number mapping (ENUM) based call routing during area code splits is described. An ENUM domain management component can associate an ENUM domain name with multiple records when a numbering plan area code split links an old area code of a telephone number corresponding to the ENUM domain name with a new area code. An ENUM provisioning component can perform permissive dialing of the old and new area code during ENUM based call routing by utilizing the multiple records.

20 Claims, 13 Drawing Sheets

(56) References Cited

OTHER PUBLICATIONS

3GPP TS 23.228, V8.8.0 3rd Generation Partnership Project; Technical Specification Group Services and System Aspects; IP Multimedia Subsystem (IMS); Stage 2 (Release 8) 224 pages, Jun. 3, 2013.

Office Action dated Jan. 24, 2012 for U.S. Appl. No. 12/481,128, 18 pages.
Office Action dated May 21, 2012 for U.S. Appl. No. 12/467,573, 21 pages.
Office Action dated Feb. 21, 2014 for U.S. Appl. No. 13/555,716, 14 pages.

PROACTIVE TELEPHONE NUMBER MAPPING CONFIGURATION MANAGEMENT

CROSS-REFERENCE

This patent application is a continuation of U.S. patent application Ser. No. 13/681,059, filed on Nov. 19, 2012, entitled "PROACTIVE TELEPHONE NUMBER MAPPING CONFIGURATION MANAGEMENT", which is a continuation of U.S. patent application Ser. No. 12/467,573 (now U.S. Pat. No. 8,363,815), filed on May 18, 2009, entitled "PROACTIVE TELEPHONE NUMBER MAPPING CONFIGURATION MANAGEMENT", which claims priority to U.S. Provisional Patent Application No. 61/159,746, filed on Mar. 12, 2009, entitled "METHOD AND APPARATUS FOR ENABLING NPA SPLIT OPERATIONS IN ENUM WITH PERMISSIVE DIALING PERIOD." The entireties of the aforementioned applications are incorporated by reference herein.

BACKGROUND

Telephone number mapping, or E.164 Number Mapping (ENUM), is a suite of protocols that unifies the E.164 telephone numbering system with the internet. ENUM associates a domain name with a telephone number, and resolves the telephone number to an internet address using Domain Name System (DNS) technology. For example, ENUM converts the telephone number 1 (206) 543-1212 into the following ENUM domain name: 2.1.2.1.3.4.5.6.0.2.1.e164.arpa. When the telephone number is dialed, e.g., utilizing the classic public switched telephone network (PSTN), a DNS query to the domain name is made, which enables indirect access to different Internet Protocol (IP) services, e.g. Voice over Internet Protocol (VoIP), IP multimedia services, etc. ENUM assigns each domain name to an ENUM domain record stored in an ENUM and/or DNS database. The ENUM domain record includes subscriber defined call forwarding and/or termination preferences, such as forwarding calls to email addresses, websites, VoIP numbers, mobile telephone numbers, voice mail, instant messaging (IM) applications, and/or other IP services.

As demand for access to information via voice and data communications has increased in response to the convergence of PSTN and internet telephony, e.g., pager, fax machine, cellular phone, and VoIP technology, a corresponding increase in demand for telephone numbers (especially in densely populated areas) has required execution of "split plans." In a split plan, a geographic region associated with an existing numbering plan area (NPA) code is divided into regions, and a new NPA code is assigned to one of the regions. To minimize misdialing frustration resulting from split plans, permissive dialing permits use of a new NPA code and an old NPA code during a permissive dialing period. At the end of the permissive dialing period, the old NPA code is no longer valid. However, conventional ENUM technology does not enable permissive dialing. Consequently, users of current ENUM technology suffer from misdialing aggravation because ENUM does permit use of a new NPA code and an old NPA code during the permissive dialing period.

The above-described deficiencies of today's communication networks and related technologies are merely intended to provide an overview of some of the problems of conventional systems, and are not intended to be exhaustive. Other problems with the state of the art and corresponding benefits of some of the various non-limiting embodiments may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
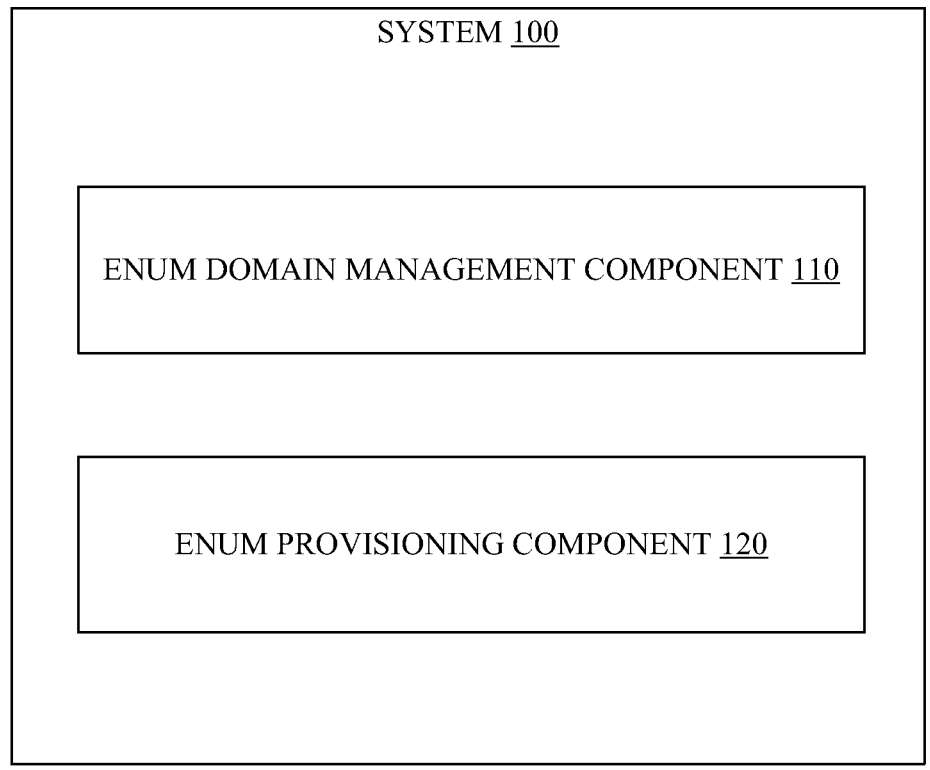
FIG. 1 illustrates a demonstrative system for effectively enabling permissive dialing within an ENUM framework, in accordance with an embodiment.

Various non-limiting embodiments of methods and apparatus are provided that perform proactive telephone number mapping (ENUM) configuration management in response to a numbering plan area (NPA) code split. Conventional ENUM technology does not allow permissive dialing operations during NPA code splits. Consequently, misdialing frustration results when a user is not able to use an old NPA code when a split plan is implemented in the user's calling area. Compared to conventional ENUM techniques, various methods and apparatus described herein effectively enable permissive dialing during NPA code split operations affecting an ENUM network.

According to one aspect of the disclosed subject matter, an ENUM domain management component can associate an ENUM domain name with multiple records when a numbering plan area (NPA) code split relates an old area code of a telephone number corresponding to the ENUM domain name with a new area code. An ENUM provisioning component can enable permissive dialing of the old and new area code during ENUM based call routing by utilizing the multiple records. In this way, ENUM technology can be operated during a permissive dialing period associated with area code splits.

According to another aspect of the disclosed subject matter, the ENUM domain management component can associate the ENUM domain name with multiple records by creating a first ENUM domain name record associated with the old area code, and creating a second ENUM domain name record associated with the new area code—the second ENUM domain name record distinct from the first ENUM domain name record. In yet another aspect of the disclosed subject matter, the ENUM domain management component can associate the ENUM domain name with multiple records prior to a time when the NPA code split relates the new area code to the old area code and/or at the time the NPA code split relates the new area code to the old area code. In one non-limiting aspect, the ENUM domain management component can disassociate the ENUM domain name from a record associated with the old area code when a permissive dialing period associated with permissive dialing ends.

In another aspect of the disclosed subject matter, a data store component can enable storage of the multiple records in a data store. The ENUM domain management component can store the multiple records in the data store, and disassociate the ENUM domain name from the record associated with the old area code by removing the record from the data store. According to yet another aspect of the disclosed subject matter, the ENUM provisioning component can enable permissive dialing of the old and new area code during ENUM based call routing by: preventing storage of records related to telephone numbers associated with the new area code before the permissive dialing period begins; preventing storage of records related to telephone numbers associated with the old area code after the permissive dialing period begins; and preventing at least one of creation, modification, or removal of the ENUM domain name during the permissive dialing period.

In one aspect of the disclosed subject matter, the ENUM domain management component can disassociate the ENUM domain name from records associated with the old area code by deleting records in the data store related to telephone numbers associated with the old area code. According to another aspect of the disclosed subject matter, an artificial intelligence component can automatically relate the ENUM domain name to a distinct record associated with a telephone number affected by an area code split; and permit dialing of an old and new area code of the telephone number during an interval of time to enable connection to an equivalent ENUM communication termination point.

In yet another aspect of the disclosed subject matter, the artificial intelligence component can automatically relate the ENUM domain name to the distinct record based on the interval of time. According to another aspect of the disclosed subject matter, the artificial intelligence component can automatically permit dialing of the old and new area code by (1) preventing storage of the distinct record before the interval of time when the telephone number includes the new area code; (2) preventing storage of the distinct record within the interval of time if the telephone number includes the old area code; and (3) preventing adjustment of the ENUM domain name during the interval of time. In one aspect of the disclosed subject matter, the artificial intelligence component can automatically eliminate the distinct record after the interval of time if the telephone number includes the old area code.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems (e.g., utilizing explicitly and/or implicitly trained classifiers) can be employed in connection with performing inference and/or probabilistic determinations and/or statistical-based determinations as in accordance with one or more aspects of the disclosed subject matter as described herein. For example, in one embodiment, an artificial intelligence system can be used in accordance with system 400 described below, e.g., artificial intelligence component 410, to automatically relate an ENUM domain name to a distinct record associated with a telephone number affected by an area code split; and to automatically permit dialing of an old and new area code of the telephone number during an interval of time to enable connection to an equivalent ENUM communication termination point.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices (e.g., hard disk, floppy disk, magnetic strips), optical disks (e.g., CD, DVD), smart cards, and flash memory devices (e.g., card, stick, key drive).

In one non-limiting aspect, methods and apparatus are provided for routing ENUM based calls in an efficient manner during an NPA code split. The North American Numbering Plan (NANP) is a system of numbering plan areas adopted by the United States and other countries. Three-digit area codes and seven-digit telephone numbers direct telephone calls to particular regions associated with a public switched telephone network (PSTN). These calls can be further routed by a local network. However, when telephone numbers are depleted within a geographical area or region, due to factors such as increased population or increased demand for telephone services (e.g., demand for fax, modem, cellular phone communications, etc.), NPA code splits can be utilized. An NPA code split involves subdividing a geographical region associated with an existing area code into two or more regions. One of the regions retains the older area code, and the other region(s) receive a new code. To reduce irritation among affected callers, permissive dialing enables calling parties to make phone calls in areas subject to a newly introduced area code using both the new and old area code. At the end of the permissive dialing period, the old area code is no longer valid for numbers in an affected area. However, conventional ENUM based routing technology does not support processing of ENUM queries based on an E.164 number during an NPA code split.

As mentioned, various non-limiting embodiments perform proactive ENUM configuration management in the event of an NPA code split, allowing permissive dialing operation in an ENUM environment. FIG. 1 illustrates a demonstrative system 100 for effectively enabling permissive dialing within an ENUM framework, in accordance with an embodiment. System 100 and the systems and processes explained below may constitute machine-executable instructions embodied within a machine (e.g., computer) readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, some of the process blocks may be executed in a variety of orders not illustrated.

As illustrated by FIG. 1, system 100 can include an ENUM domain management component 110 that can associate an ENUM domain name with multiple records when a numbering plan area (NPA) code split relates an old area code of a telephone number corresponding to the ENUM domain name with a new area code. System 100 can also include an ENUM provisioning component 120 that can enable permissive dialing of the old and new area code during ENUM based call routing by utilizing the multiple records. The multiple records act like database index keys, or pointers, to a database location associated with a telephone number affected by a change in area code—each record associated with a different area code assigned to the telephone number. In this way, although the multiple records are different from each other, permissive dialing is enabled by referring records associated with an affected telephone number to an ENUM domain name related to the number.

Moreover, it should be appreciated by a person of ordinary skill in the art that ENUM based call routing can include routing calls utilizing voice and/or video protocol (e.g., Session Initiation Protocol (SIP)), instant messaging (IM) technology, and/or email). For example, if a calling party dials a called party's ENUM number from a PSTN network, the ENUM number will be translated at an ENUM server (see e.g. component 1040 of FIG. 10) into a corresponding Uniform Resource Identifier (URI). This URI can be used to look-up and fetch a record (e.g., a Naming Authority Pointer (NAPTR) record (see e.g., FIG. 13). The NAPTR record defines the calling party's wishes (or access information) as to how the call should be forwarded or terminated (e.g., internet protocol (IP) or PSTN terminations).

Figure 13:
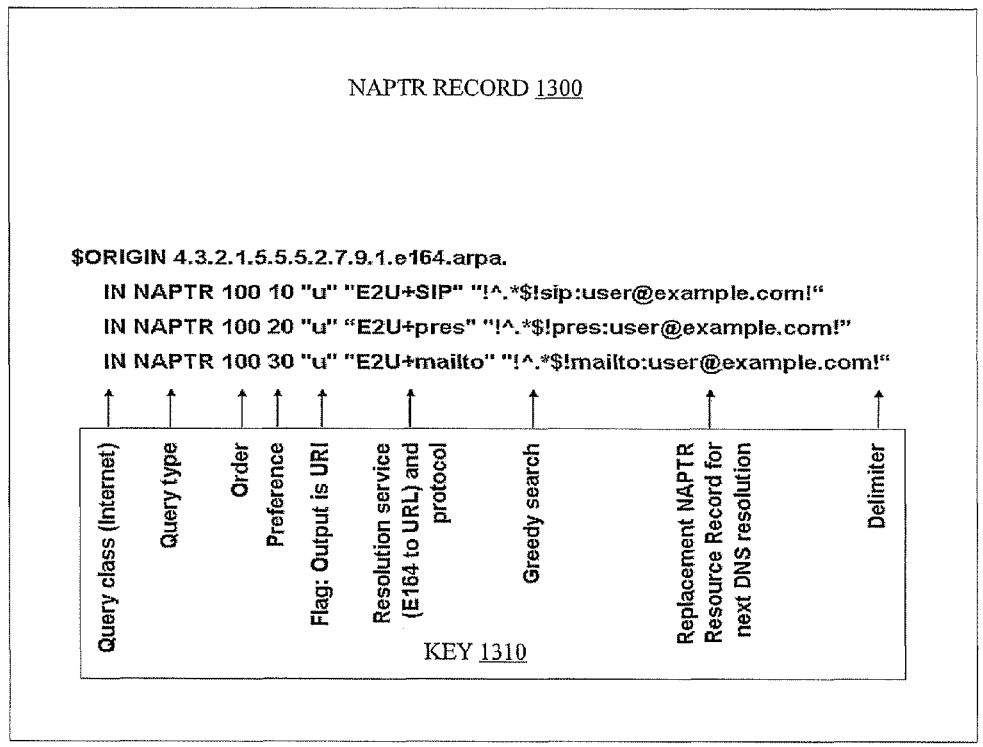
FIG. 13 illustrates a demonstrative NAPTR record, in accordance with an embodiment.

Referring now to FIG. 13, an NAPTR record 1300 is illustrated, in accordance with an embodiment. An NAPTR record can refer to an email address, a fax number, a personal website, a voice over IP (VoIP) number, a mobile telephone number, voice mail, IP-telephony address(es), web page(s), GPS coordinate(s), call diversion(s), IM, and/or presence information. As depicted by key 1310, NAPTR record 1300 refers to an SIP service ("E2U+SIP"), a presence service ("E2U+pres"), and an email service (E2U+mailto"). Accordingly, in one embodiment, system 100 can enable permissive dialing within an ENUM framework by appropriately routing calls associated with NAPTR record 1300 to an ENUM communication termination point defined by NAPTR record 1300 (e.g., an SIP service, a presence service, or an email service).

Referring now to FIG. 1, ENUM domain management component 110 can associate the ENUM domain name with multiple records by creating a first ENUM domain name record associated with the old area code; and creating a second ENUM domain name record associated with the new area code, wherein the second ENUM domain name record is distinct from the first ENUM domain name record. As stated above, the permissive dialing can be enabled by utilizing different records related to different area codes assigned to a phone number. Thus, in one embodiment, permissive dialing can be enabled by assigning a first and second ENUM domain name record (related to an NPA code split affected telephone number) to an ENUM domain associated with the telephone number. In another embodiment, the ENUM domain management component can associate the ENUM domain name with multiple records prior to a time when the NPA code split relates the new area code to the old area code; or at the time when the NPA code split relates the new area code to the old area code. In yet another embodiment, the ENUM domain management component 110 can disassociate the ENUM domain name from a record associated with the old area code when a permissive dialing period associated with permissive dialing ends.

Figure 2:
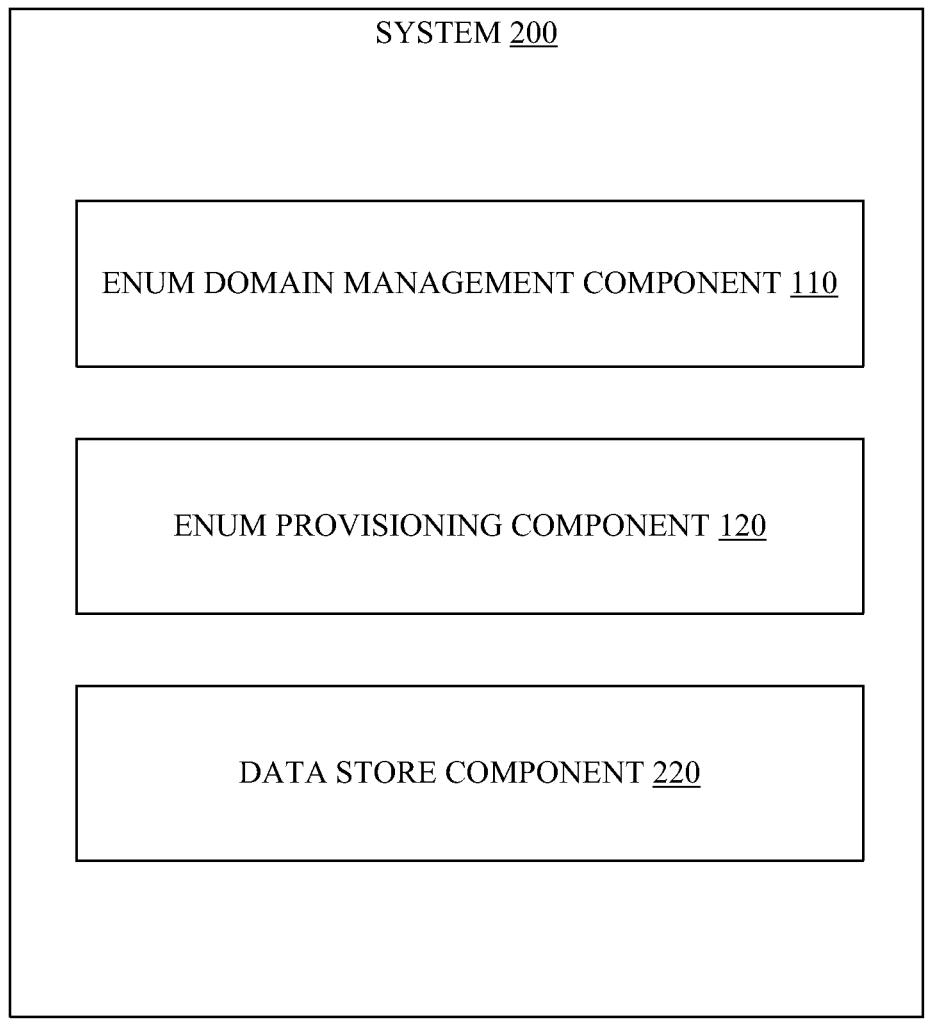
FIG. 2 illustrates another demonstrative system for effectively enabling permissive dialing within an ENUM framework, in accordance with an embodiment.

FIG. 2 illustrates a demonstrative system 200 that includes a data store component 220 for effectively enabling permissive dialing within an ENUM framework, in accordance with an embodiment. Data store component 220 can enable storage of multiple records in a data store (not shown). It should be appreciated that the data store can be any storage medium, such as ENUM database 1030 described below and illustrated in FIG. 10; and removable/non-removable, volatile/nonvolatile computer storage media as described below and illustrated in FIG. 11 (see e.g., 1124 and 1146). In one embodiment, ENUM domain management component 110 can disassociate the ENUM domain name from the record associated with the old area code by removing the record from the data store. In another embodiment, ENUM provisioning component 120 can enable permissive dialing of the old and new area code during ENUM based call routing by preventing records from being stored in the data store when the records are related to telephone numbers associated with the new area code and the permissive dialing period has not started. According to yet another embodiment, ENUM provisioning component 120 can enable permissive dialing of the old and new area code during ENUM based call routing by preventing records from being stored in the data store when the records are related to telephone numbers associated with the old area code and the permissive dialing period has started.

In one embodiment, ENUM provisioning component 120 can enable permissive dialing of the old and new area code during ENUM based call routing by preventing at least one of creation, modification, or removal of the ENUM domain name during the permissive dialing period. Further, ENUM domain management component 120 can disassociate the ENUM domain name from records associated with the old area code by deleting records from the data store that are related to telephone numbers associated with the old area code.

Figure 3:
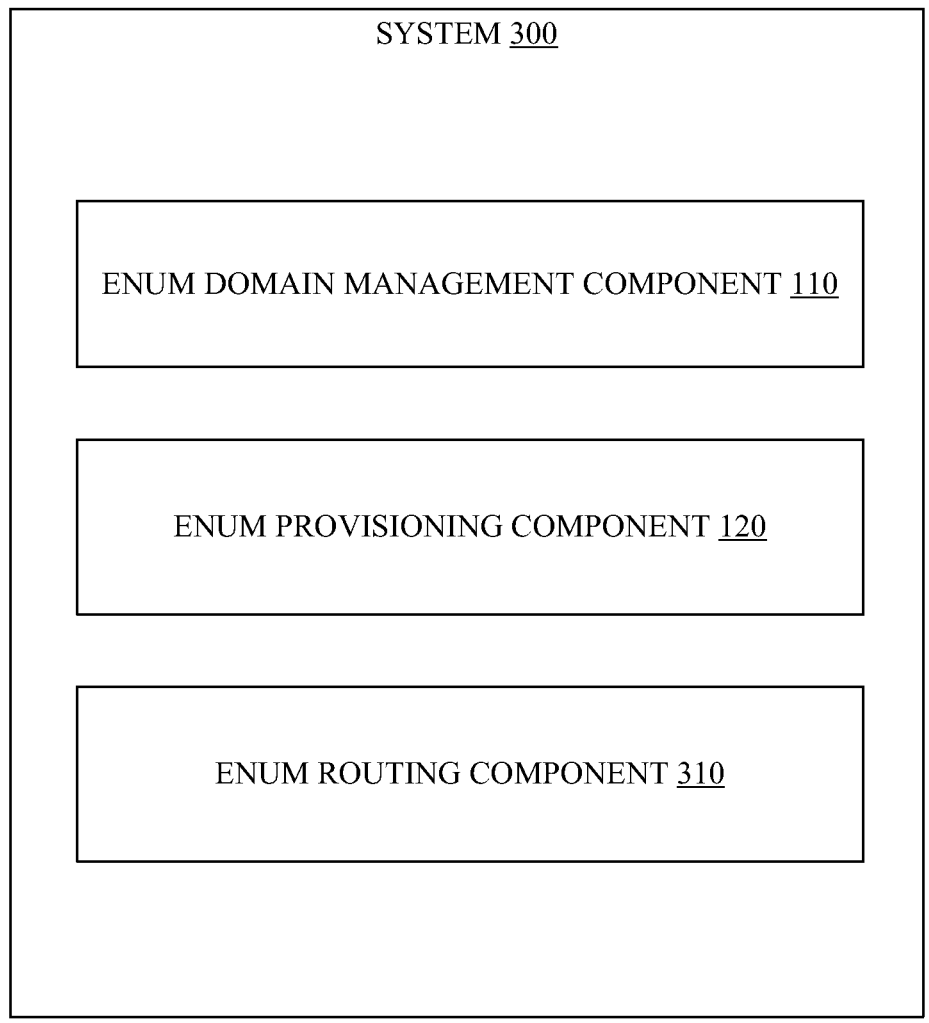
FIG. 3 illustrates a demonstrative system that includes an ENUM routing component for effectively enabling permissive dialing within an ENUM framework, in accordance with an embodiment.

FIG. 3 illustrates a demonstrative system 300 that includes an ENUM routing component 310 for effectively enabling permissive dialing within an ENUM framework, in accordance with an embodiment. ENUM routing component 310 can route ENUM based calls via an internet protocol (IP) Multimedia Subsystem (IMS); a voice protocol endpoint; an instant messenger (IM) endpoint; an email; a web site; a public switched telephone network (PSTN) endpoint; a wireless endpoint; or a cellular based endpoint. ENUM routing component 310 can translate an ENUM number at an ENUM Server (see e.g. component 1040 of FIG. 10) into a corresponding Uniform Resource Identifier (URI). The URI can be used to look-up and fetch an NAPTR record (e.g., NAPTR record 1300 illustrated by FIG. 13) that defines how a call should be forwarded or terminated. As such, the NAPTR record can define how ENUM routing component 310 will route ENUM based calls.

Figure 4:
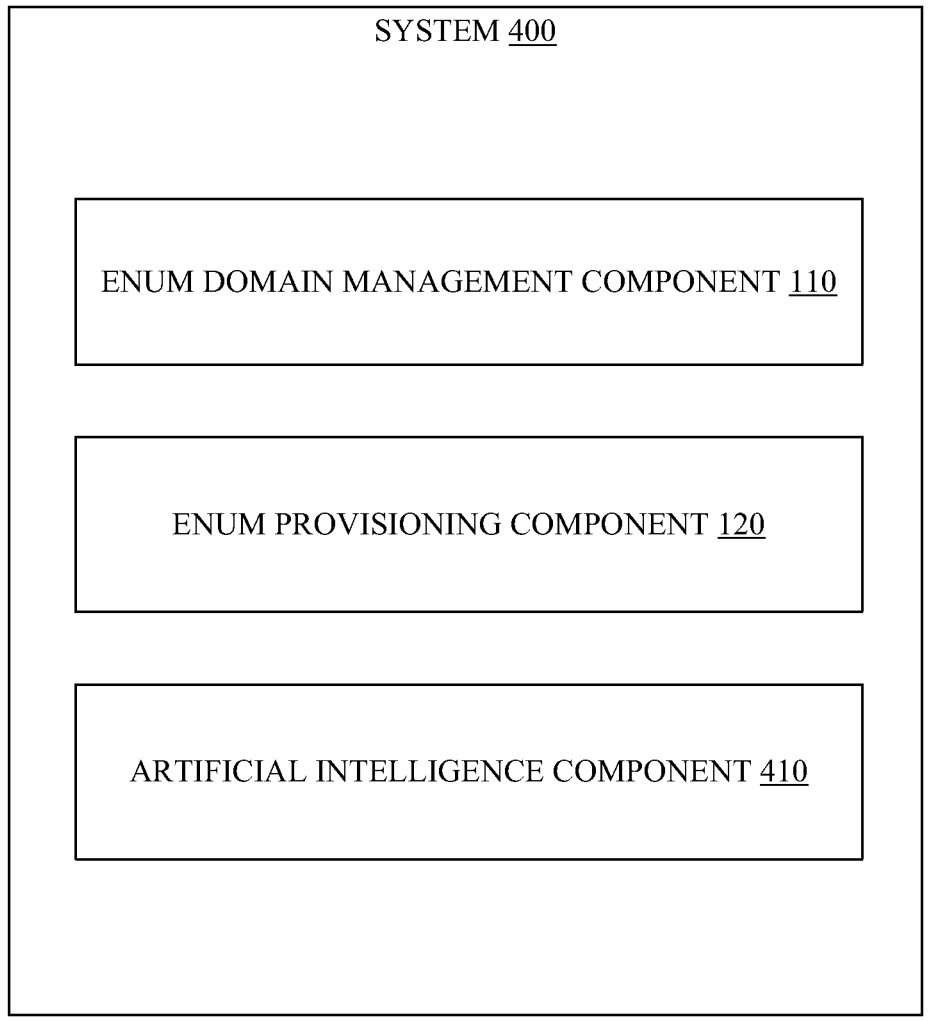
FIG. 4 illustrates a demonstrative system that includes an artificial intelligence component for effectively enabling permissive dialing within an ENUM framework, in accordance with an embodiment.

FIG. 4 illustrates a demonstrative system 400 that includes an artificial intelligence component 410 for effectively enabling permissive dialing within an ENUM framework, in accordance with an embodiment. Artificial intelligence component 410 can automatically relate an ENUM domain name to a distinct record associated with a telephone number affected by an NPA code split. Further, artificial intelligence component 410 can automatically permit dialing of an old and new area code of the telephone number during an interval of time to enable connection to an equivalent ENUM communication termination point. In another embodiment, artificial intelligence component 410 can automatically permit dialing of the old and new area code by preventing the distinct record from being stored in a data store (e.g., a data store associated with data store component 210 described above) before the start of the interval of time when the telephone number includes the new area code; and automatically preventing the distinct record from being stored in the data store within the interval of time when the telephone number includes the old area code. In yet another embodiment, artificial intelligence component 410 can automatically permit dialing of the old and new area code by preventing adjustment of the ENUM domain name during the interval of time. According to another embodiment, artificial intelligence component 410 can automatically eliminate the distinct record after the interval of time when the telephone number includes the old area code.

It should be appreciated that automatic operations described above can be facilitated via an automatic classifier system and/or process. A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed, e.g., enabling permissive dialing during NPA code split operations affecting an ENUM network. In the case of systems that enable permissive dialing within an ENUM framework, for example, such actions can include actions performed by artificial intelligence component 410 described above.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches that include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing systems and/or user behavior, receiving extrinsic information). For example, SVM's are configured via a learning or training phase within a classifier constructor and feature selection module. Thus, the classifier(s) can be used to automatically learn and perform a number of functions, including, but not limited to, functions performed by artificial intelligence component 410 as described above. For example, artificial intelligence component 410 can employ classifier(s) to determine telephone numbers affected by an NPA code split. Moreover, artificial intelligence component 410 can employ classifier(s) to determine time intervals described above.

FIGS. 5-9 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
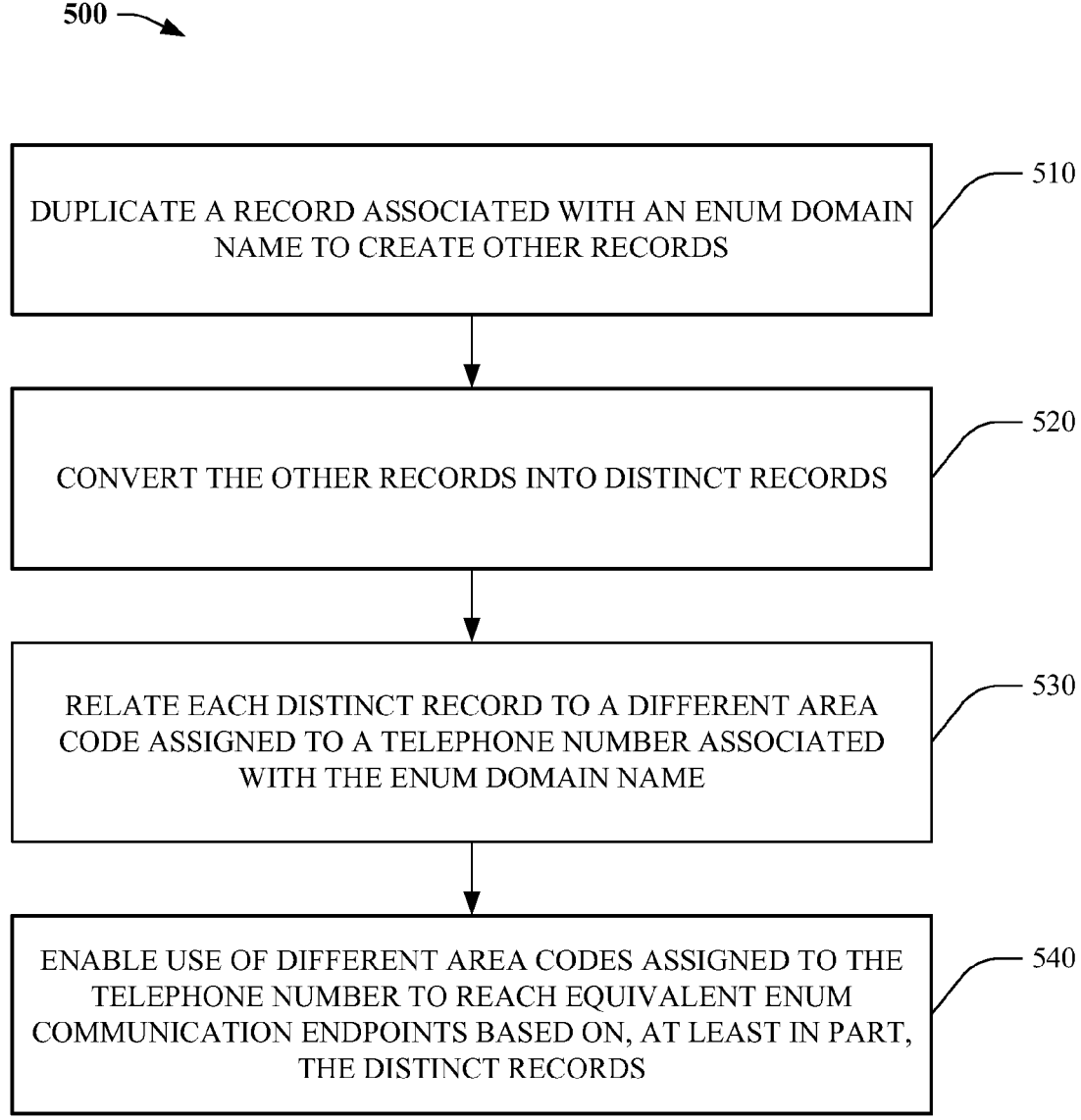
FIG. 5 illustrates a process for effectively enabling permissive dialing within an ENUM framework, in accordance with an embodiment.

Referring now to FIG. 5, a process 500 for effectively enabling permissive dialing within an ENUM framework is illustrated, in accordance with an embodiment. At 510, a record associated with a telephone number mapping (ENUM) domain name can be duplicated to create other records. The other records can be converted into distinct records at 520. At 530, each distinct record can be associated with different area codes, the different area codes assigned to a telephone number related to an ENUM domain name. As described above, permissive dialing during an NPA code split can be enabled by referring records associated with an affected telephone number to an ENUM domain name related to the number. At 530, calling parties can use different area codes assigned to a telephone number to reach equivalent ENUM communication endpoints by utilizing the distinct records.

Figure 6:
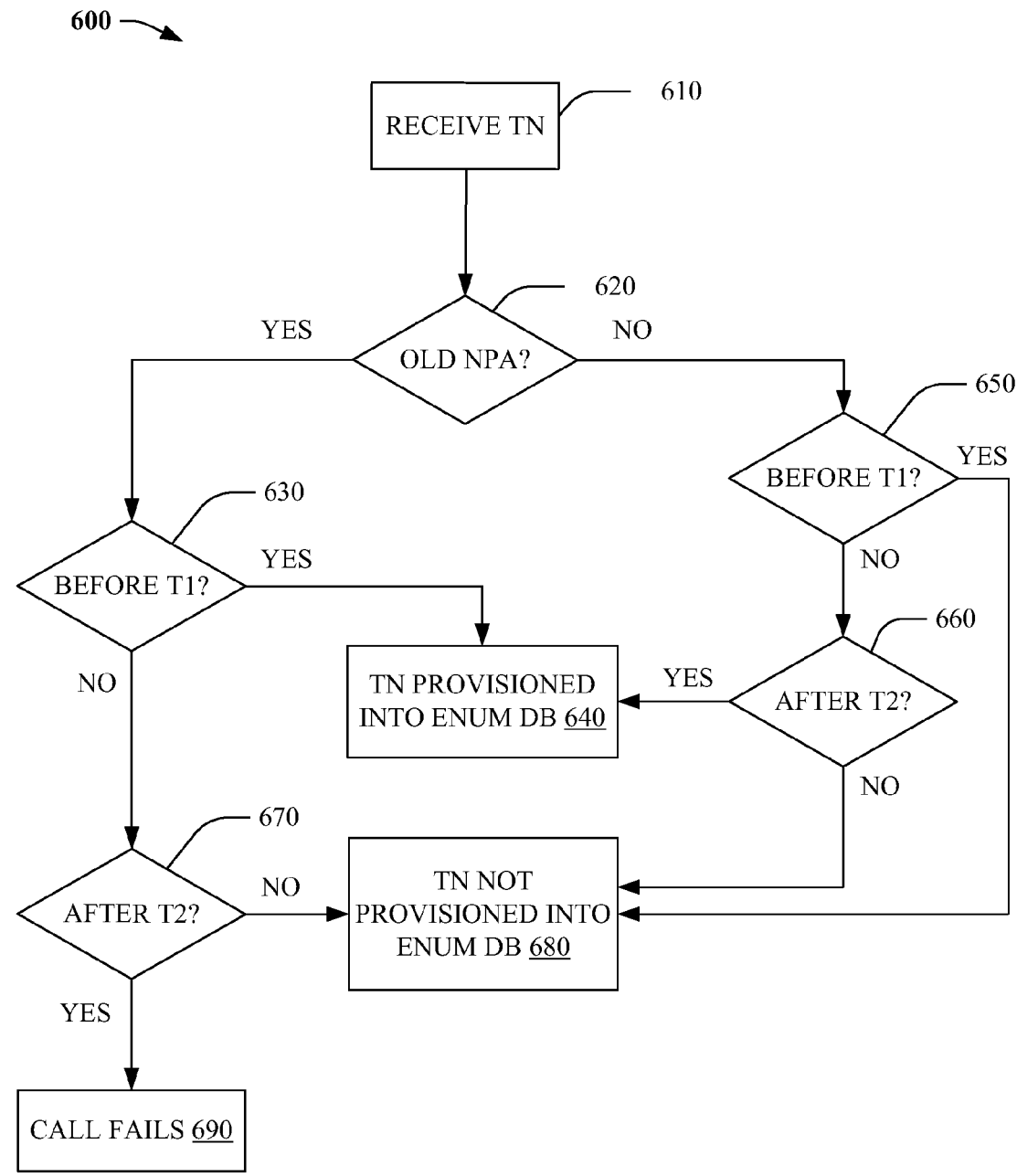
FIG. 6 illustrates another process for effectively enabling permissive dialing within an ENUM framework, in accordance with an embodiment.

FIG. 6 illustrates a process 600 for effectively enabling permissive dialing within an ENUM framework, in accordance with an embodiment. At 610, a telephone number (TN) can be received. At 620, it can be determined whether the telephone number is associated with an old NPA. If it is determined that the telephone number is associated with an old NPA, flow can proceed to 630, at which it can be determined whether the telephone number was received before a time (T1) (T1 is a time when a new area code associated with the telephone number becomes effective and a permissive dialing period begins). The telephone number can be provisioned into an ENUM database (e.g., see 1030 in FIG. 10) at 640 if the telephone number (associated with the old NPA) was received before time T1; otherwise, flow can proceed to 670. If it is determined at 670 that the telephone number was received between T1 and another time (T2) (T2 is a time when the permissive dialing period ends), then flow can proceed to 680, at which the telephone number is not provisioned into the ENUM database; otherwise, flow can proceed to 690, at which the call fails because the old NPA is no longer valid because the permissive dialing period ended.

If it is determined at 620 that the telephone number is associated with a new NPA, flow can proceed to 650, at which it is determined whether the telephone number (associated with the new NPA) was received before the time T1. Flow can proceed to 680 if it is determined at 650 that the telephone number was received before the time T1—at 680, the telephone number is not provisioned into the ENUM database; otherwise, flow can proceed to 660. If flow proceeds to 660, then it can be determined whether the telephone number was received between T1 and T2. If the telephone number was received between T1 and T2, then the telephone number is not provisioned into the ENUM database, otherwise the telephone number is provisioned into the ENUM database at 640.

Figure 7:
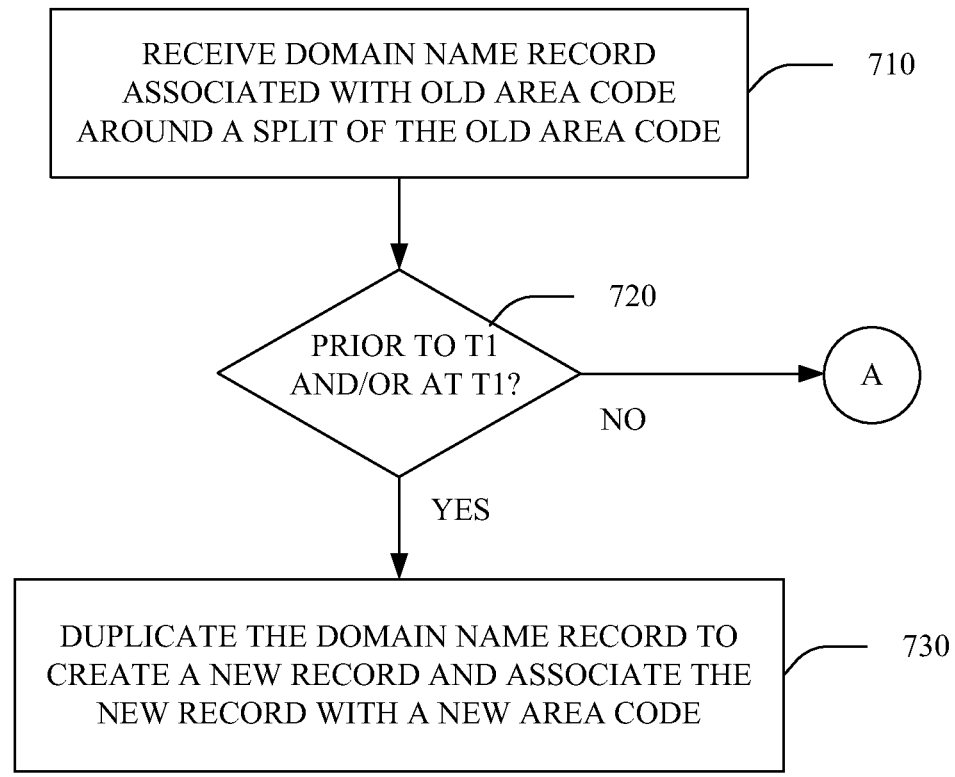
FIG. 7 illustrates part of a process for duplicating domain names, in accordance with an embodiment.
Figure 8:
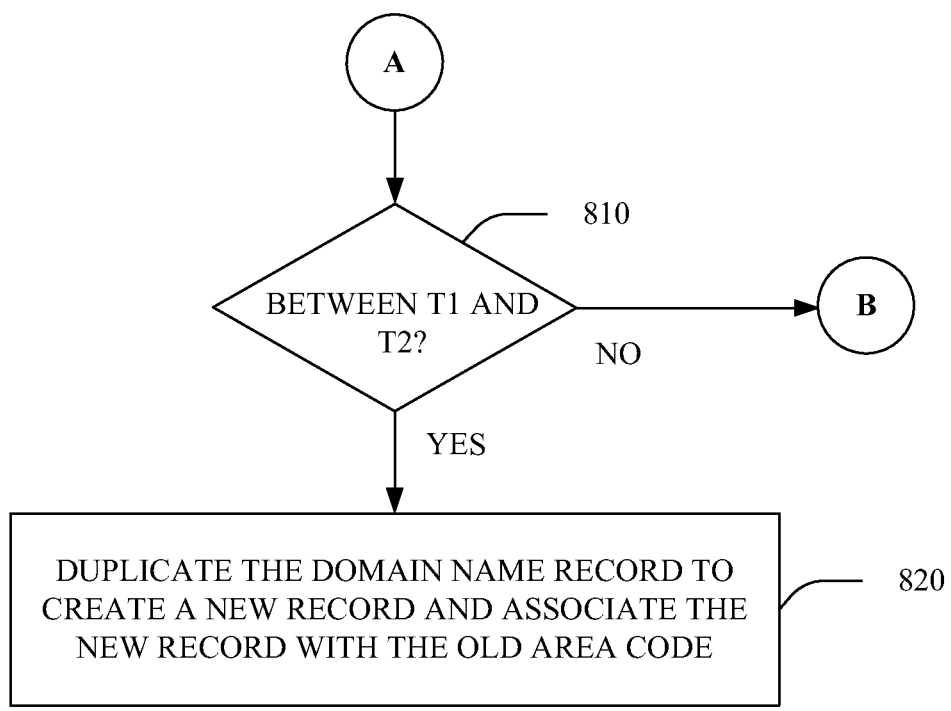
FIG. 8 illustrates another part of the process for duplicating domain names, in accordance with an embodiment.
Figure 9:
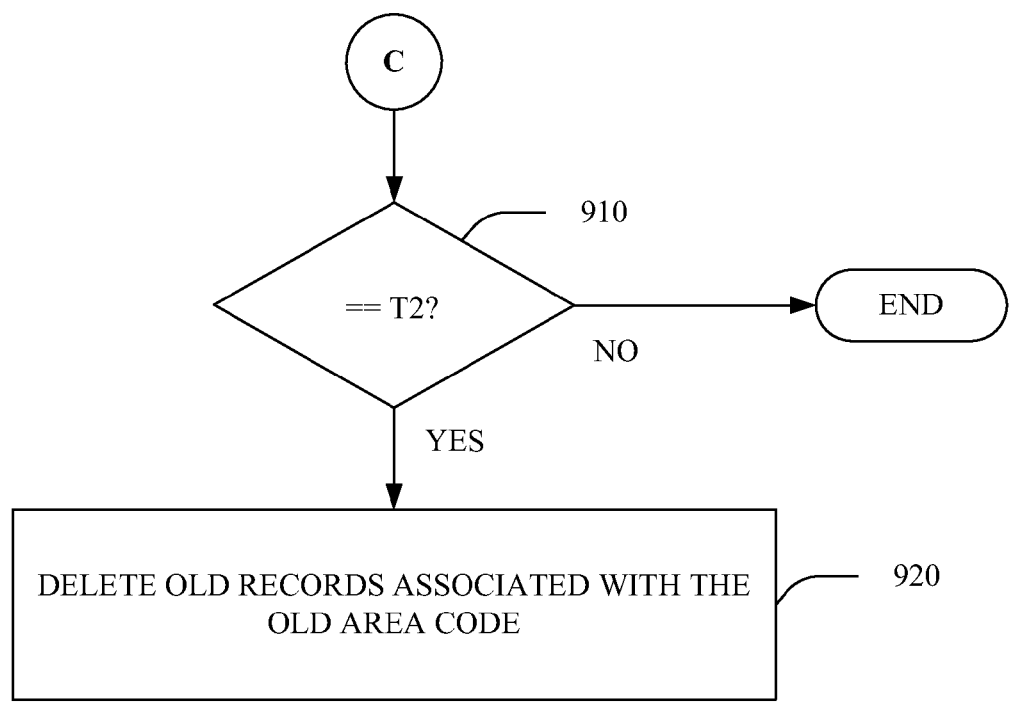
FIG. 9 illustrates yet another part of the process for duplicating domain names, in accordance with an embodiment.

FIGS. 7-9 illustrate a process for duplicating domain names, in accordance with an embodiment. A domain name record associated with an old area code can be received around the time of a split of the area code at 710. At 720, it can be determined whether the domain name record was received prior to T1 and/or at T1. If it is determined that the domain name record was received prior to and/or at T1, then flow can proceed to 730, at which the domain name record can be duplicated to create a new record, the new record associated with a new area code. If it is determined that the domain record was received after T1, it can be determined (at 810) whether the domain record was received between T1 and T2. If it is determined that the domain record was received between T1 and T2, then flow can proceed to 820, at which the domain name record can be duplicated to create a new record, the new record associated with the old area code; otherwise, flow can proceed to 910. If it is determined at 910 that the domain record was received at T2, then records associated with the old area code can be deleted at 920, otherwise, flow ends.

Figure 10:
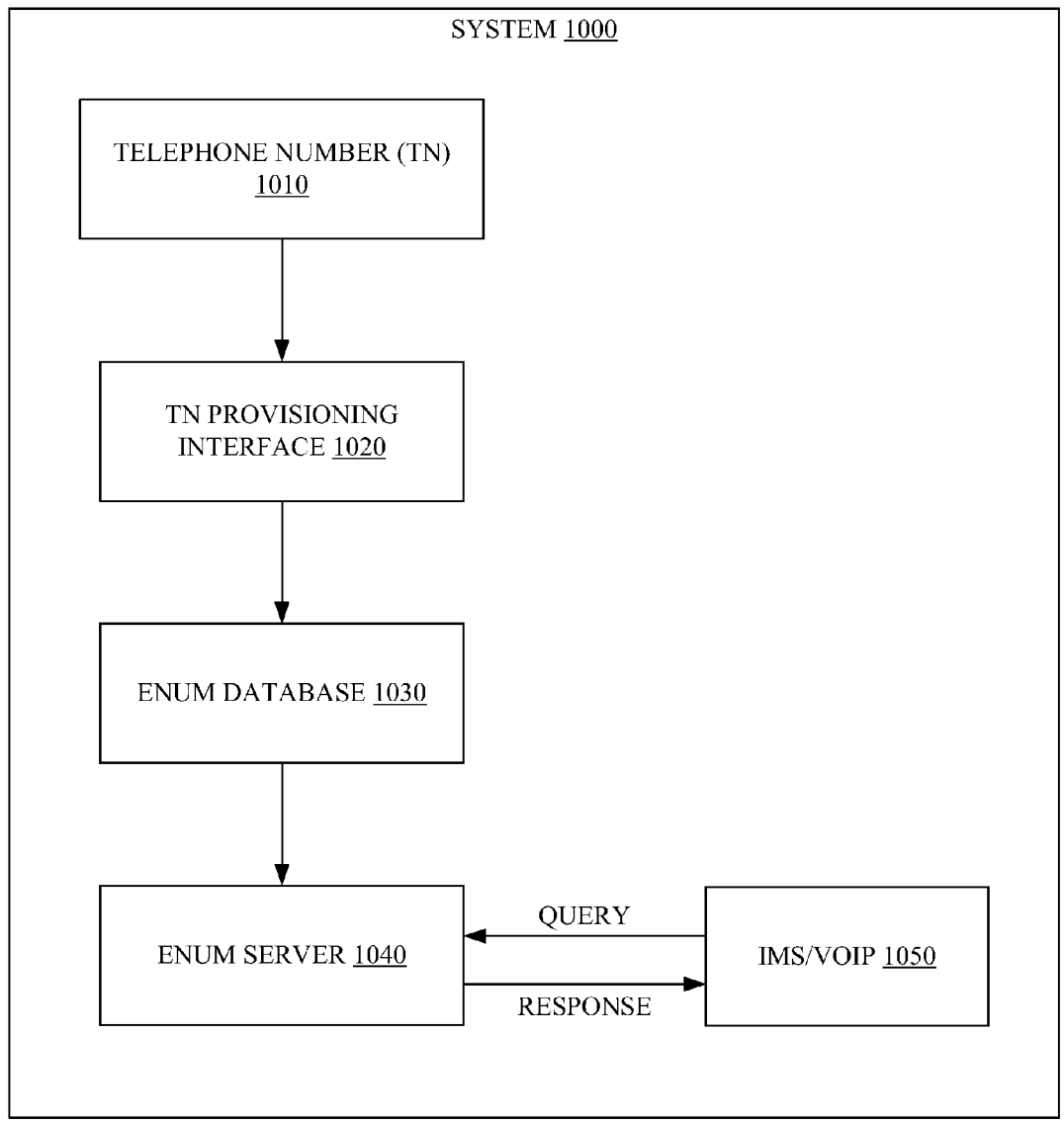
FIG. 10 illustrates a block diagram of a system that enables permissive dialing within an ENUM framework, in accordance with an embodiment.

FIG. 10 illustrates a block diagram of a system 1000 that enables permissive dialing within an ENUM framework, in accordance with an embodiment. System 1000, as illustrated by FIG. 10, can perform the acts described above related to the discussion of FIGS. 7-9. For example, TN provisioning interface 1020 can receive a telephone number associated with an old area code around a time of a split of the old area code. Further, TN provisioning interface 1020 can perform associated operations as recited in the discussions related to FIGS. 7-9 above. In addition, ENUM database 1030, as described above, can be associated with a data store that stores multiple records for enabling permissive dialing. Moreover, telephone numbers can be provisioned into ENUM database 1030. In one example, provisioning comprises storing domain names associated with telephone numbers in the ENUM database 1030. (See e.g., FIGS. 5-9).

In another embodiment, ENUM server 1040 can receive a domain name and return NAPTR record(s) associated with the domain name (e.g., NAPTR record 1300 illustrated by FIG. 13), the NAPTR record(s) storing access and priority information. According to another embodiment, IMS/VoIP component 1050 can enable system 1000 to perform ENUM based call routing in internet protocol (IP) Multimedia Subsystem (IMS) based voice over IP (VoIP) networks. For example, at a time of call processing, VoIP/IMS network 1050 can: (1) receive an INVITE message; (2) form an ENUM query (e.g., $ORIGIN 2.8.0.0.6.9.2.5.5.5.1.e164enum.provider.net); and (3) send the ENUM query to ENUM server 1040. ENUM server 1040 can (1) receive the query; (2) find an associated NAPTR record (e.g., NAPTR record 1300 illustrated by FIG. 13); and (3) return the response as NAPTR 10 100 "u" "E2U+sip" "!^.*$!sip:+15552960082!", based on the associated NAPTR record.

Figure 11:
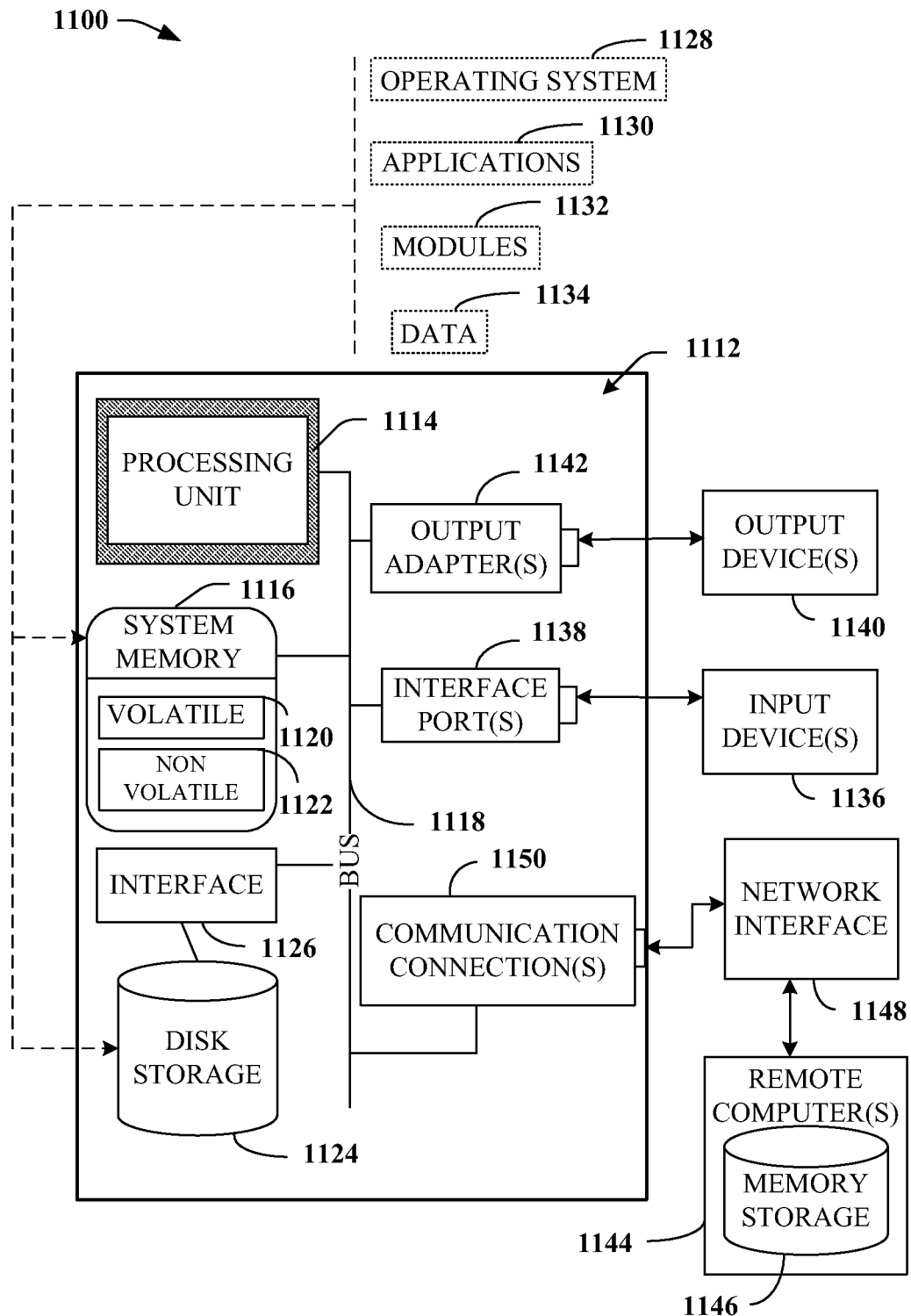
FIG. 11 illustrates a block diagram of a computer operable to execute the disclosed methods and apparatus, in accordance with an embodiment.
Figure 12:
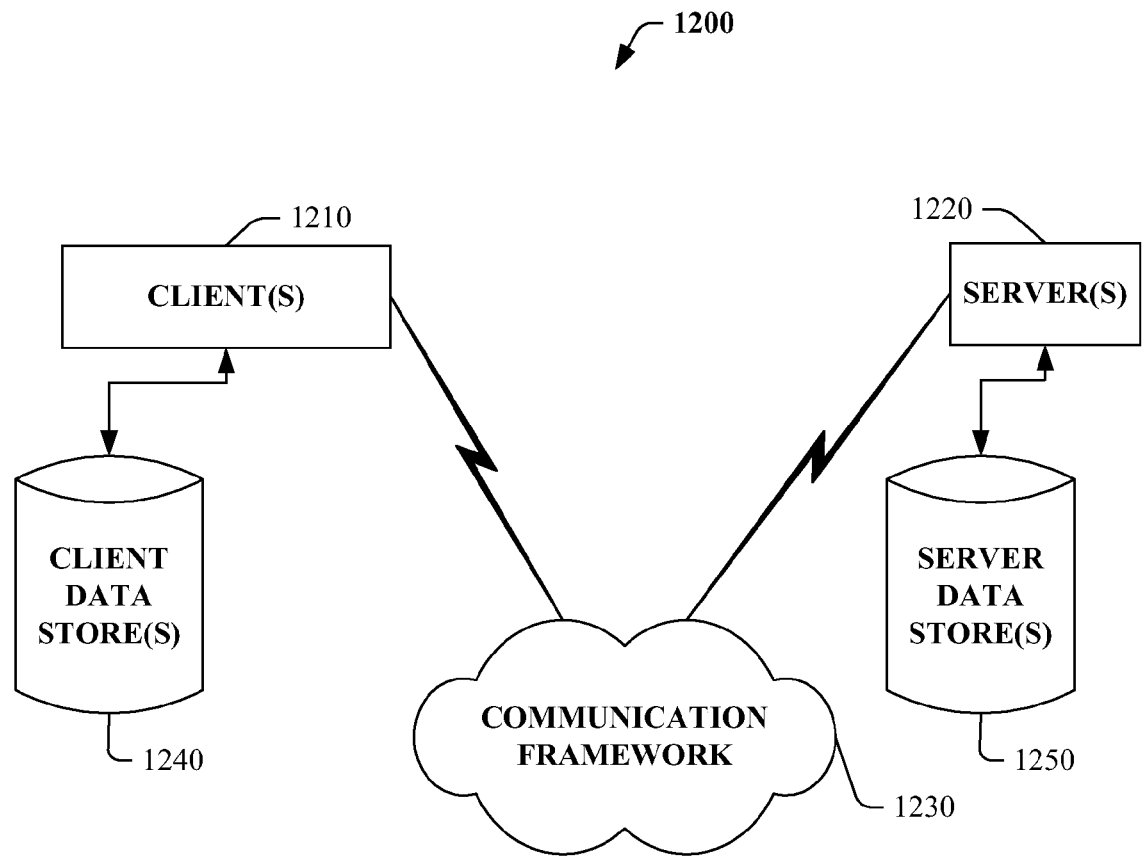
FIG. 12 illustrates a schematic block diagram of an exemplary computing environment, in accordance with an embodiment.

In order to provide a context for the various aspects of the disclosed subject matter, FIGS. 11 and 12, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject innovation can be practiced on stand-alone computers. In a distributed computing environment, program modules may be located in both local and remote memory storage devices.

With reference to FIG. 11, a block diagram of a computer 1100 operable to execute the disclosed systems and methods, in accordance with an embodiment, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user enters commands or information into the computer 1111 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136.

Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refer(s) to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 illustrates a schematic block diagram of an exemplary computing environment 1230, in accordance with an embodiment. The system 1200 includes one or more client(s) 1210. The client(s) 1210 can be hardware and/or software (e.g., threads, processes, computing devices). The system 1200 also includes one or more server(s) 1220. Thus, system 1200 can correspond to a two-tier client server model or a multi-tier model (e.g., client, middle tier server, data server), amongst other models. The server(s) 1220 can also be hardware and/or software (e.g., threads, processes, computing devices). The servers 1220 can house threads to perform transformations by employing the subject innovation, for example. One possible communication between a client 1210 and a server 1220 may be in the form of a data packet transmitted between two or more computer processes.

The system 1200 includes a communication framework 1230 that can be employed to facilitate communications between the client(s) 1210 and the server(s) 1220. The client(s) 1210 are operatively connected to one or more client data store(s) 1240 that can be employed to store information local to the client(s) 1210. Similarly, the server(s) 1220 are operatively connected to one or more server data store(s) 1250 that can be employed to store information local to the servers 1220.

The above description of illustrated embodiments, including what is described in the Abstract, is not intended to be exhaustive or to limit the precise forms disclosed. While specific embodiments and examples are described herein for illustrative purposes, various modifications are possible consistent with the knowledge of practitioners in the relevant art.

While the various embodiments have been described in connection with the preferred embodiments of the various figures, it is to be understood that other similar embodiments may be used, or modifications and additions may be made to the described embodiment, for performing the same function without deviating therefrom. Therefore, the present invention should not be limited to any of the one or more embodiments described herein, but rather should be construed in breadth and scope in accordance with the appended claims.

What is claimed is:

1. A system, comprising:
   a memory to store instructions; and
   a processor, coupled to the memory, that facilitates execution of the instructions to perform operations, comprising:
   in response to determining that second data representing a numbering plan area code split relates an old area code of area codes that are assigned to a telephone number corresponding to a telephone number mapping domain name to a new area code of the area codes, associating first data representing the telephone number mapping domain name with records representing the area codes;
   facilitating, based on the records, use of the old area code and the new area code associated with call routing utilizing the first data representing the telephone number mapping domain name;
   permitting, for a predetermined period of time, dialing of the old area code and the new area code to facilitate connection to a telephone number mapping communication termination point device;
   relating the first data representing the telephone number mapping domain name to a record of the records based on the predetermined period of time;
   preventing a modification of the first data representing the telephone number mapping domain name during the predetermined period of time; and
   in response to determining that a permissive dialing period representing the predetermined period of time has ended, disassociating the first data representing the telephone number mapping domain name from one of the records that is associated with the old area code.

2. The system of claim 1, wherein the operations further comprise:
   creating a first telephone number mapping domain name record of the records that is associated with the old area code.

3. The system of claim 2, wherein the operations further comprise:
   creating a second telephone number mapping domain name record of the records that is associated with the new area code, wherein the second telephone number mapping domain name record is different than the first telephone number mapping domain name record.

4. The system of claim 1, wherein the operations further comprise:
   relating the new area code to the old area code using the second data after the first data is associated with the records.

5. The system of claim 1, wherein the operations further comprise:
   in response to determining that the one of the records that is associated with the old area code has been removed from a data store, disassociating the first data representing the telephone number mapping domain name from the one of the records.

6. The system of claim 1, wherein the operations further comprise:
   preventing storage of another one of the records related to the new area code before the permissive dialing period representing the predetermined period of time begins.

7. The system of claim 1, wherein the operations further comprise:
   preventing storage of the one of the records related to the old area code after the permissive dialing period representing the predetermined period of time begins.

8. The system of claim 1, wherein the operations further comprise:
   deleting the one of the records from a data store that is associated with the old area code.

9. The system of claim 1, wherein the operations further comprise:
   in response to determining that the telephone number comprises the new area code, preventing storage of another one of the records before the permissive dialing period representing the predetermined period of time.

10. The system of claim 9, wherein the operations further comprise:
    in response to determining that the telephone number comprises the old area code, preventing storage of the other one of the records within the permissive dialing period.

11. The system of claim 1, wherein the operations further comprise:
    in response to determining that the telephone number comprises the old area code, eliminating another one of the records after the permissive dialing period representing the predetermined period of time.

12. The system of claim 1, wherein the operations further comprise:
    routing a telephone number mapping based call to a cellular based endpoint.

13. The system of claim 1, wherein the operations further comprise:
    storing the first data representing the telephone number mapping domain name in a domain name system data store.

14. A method, comprising:
creating, by a system comprising a processor, a first record and a second record, wherein the first record represents a first area code that is assigned to a telephone number associated with a telephone number mapping domain name, and wherein the second record represents a second area code that is assigned to the telephone number;
linking, by the system utilizing the first record and the second record, the first area code and the second area code to a telephone number mapping communication termination point device;
in response to permitting, for a predetermined period of time, dialing of the first area code and the second area code, facilitating, by the system based on the first area code and the second area code, directing a call to the telephone number mapping communication termination point device;
relating, by the system, the first record to the second record based on the predetermined period of time; preventing, by the system, a change of data representing the telephone number mapping domain name during a permissive dialing period representing the predetermined period of time; and
in response to determining that the permissive dialing period has ended, disassociating, by the system, the data representing the telephone number mapping domain name from the first record.

15. The method of claim 14, further comprising:
preventing, by the system, storage of the first record before the permissive dialing period begins.

16. The method of claim 14, further comprising:
in response to determining that the telephone number comprises the second area code, preventing storage of a record before the permissive dialing period representing the predetermined period of time.

17. The method of claim 16, further comprising:
in response to determining that the telephone number comprises the first area code, preventing storage of the record within the permissive dialing period.

18. A non-transitory computer readable medium storage device comprising computer executable instructions that, in response to execution, cause a computing system comprising a processor to perform operations, comprising:
creating different records referencing data representing a telephone number mapping domain name that is associated with a telephone number and different area codes that are associated with the telephone number;
linking the different area codes to a telephone number mapping communication termination point device;
in response to permitting, for a predetermined period of time, dialing of the call using a first area code of the different area codes and a second area code of the different area codes, facilitating routing, based on the first area code and the second area code, a call to a telephone communication mapping device utilizing the different records;
relating, based on the predetermined period of time, a first record of the different records associated with the first area code and a second record of the different records associated with the second area code;
preventing a modification of the data representing the telephone number mapping domain name during the predetermined period of time; and
in response to determining that a permissive dialing period representing the predetermined period of time has ended, disassociating the data from the first record.

19. The non-transitory computer readable medium storage device of claim 18, wherein the operations further comprise:
preventing storage of the first record before the permissive dialing period representing the predetermined period of time begins.

20. The non-transitory computer readable medium storage device of claim 18, wherein the operations further comprise:
eliminating the first record after the permissive dialing period representing the predetermined period of time, wherein the first area code is older than the second area code.

* * * * *